July 3, 1951 P. C. KEITH 2,558,760
HYDROCARBON SYNTHESIS
Filed Aug. 24, 1946
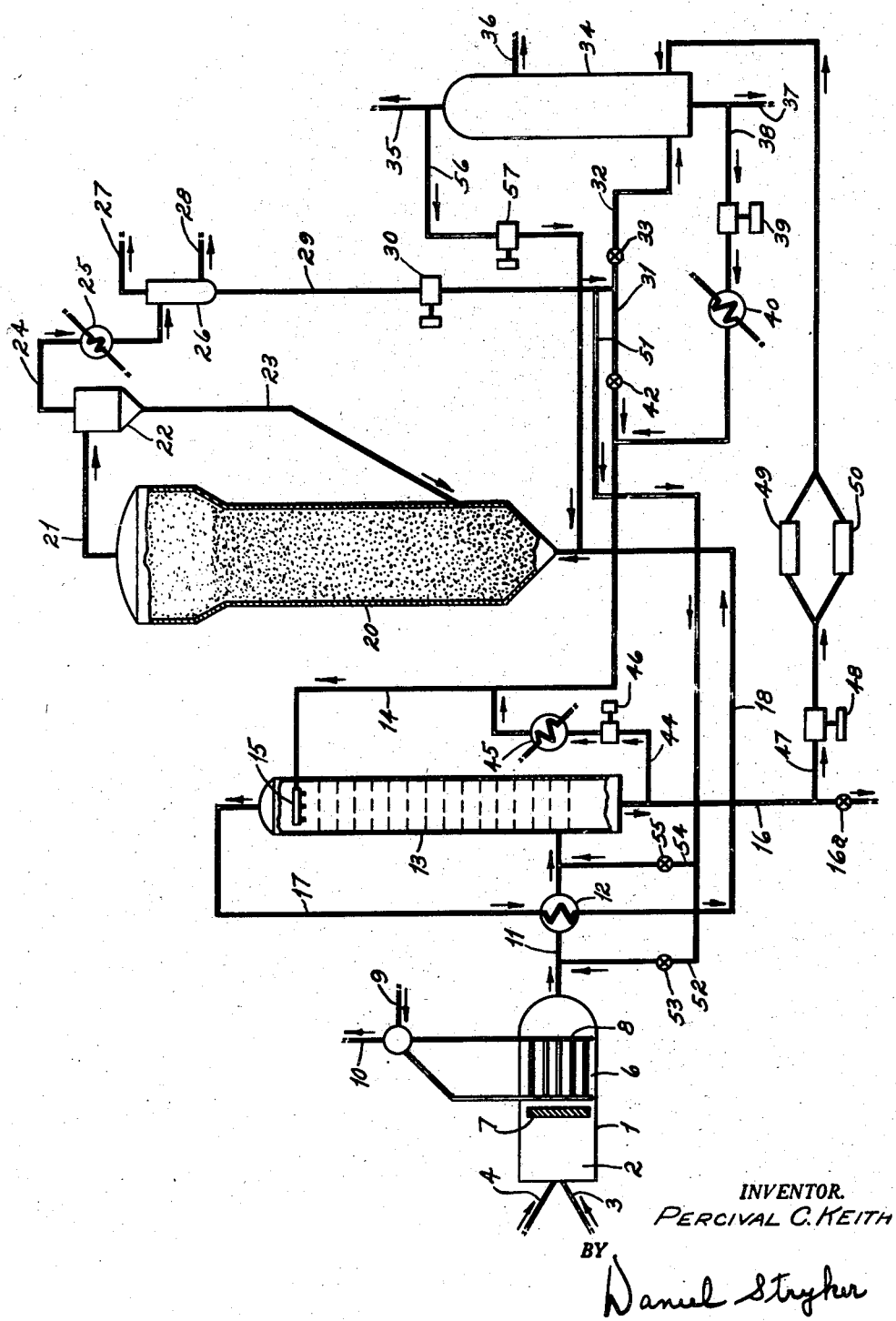
INVENTOR.
PERCIVAL C. KEITH
BY
Daniel Stryker Patented July 3, 1951

2,558,760

UNITED STATES PATENT OFFICE 2,558,760

HYDROCARBON SYNTHESIS

Percival C. Keith, Peapack, N. J., assignor to Hydrocarbon Research, Inc., New York, N. Y., a corporation of New Jersey Application August 24, 1946, Serial No. 692,874

7 Claims. (Cl. 260—449.6)

The present invention relates to the art of catalytic conversion and is more specifically concerned with catalytic reduction of carbon oxides by hydrogen for the purpose of synthesizing hydrocarbons and oxygenated hydrocarbons.

The synthesis of hydrocarbon products from gaseous mixtures containing carbon monoxide and hydrogen involves the passage of these gases in contact with a catalytic mass comprising an iron, nickel, or cobalt catalyst, for example, under conditions of elevated temperature and pressure. It has, however, been found advisable in locations where large amounts of natural gas, comprising primarily methane, are available, to generate mixtures of carbon monoxide and hydrogen by controlled reaction with oxygen. As is known, this reaction may be carried out under conditions adapted to result in the optimum molar ratio of hydrogen to carbon monoxide required for the synthesis reaction. Where relatively pure oxygen is used, there is relatively little dilution of the final synthesis gas with nitrogen or other inert gases.

Other processes for the production of synthesis gas, involve, for example, the reaction of methane and steam or methane and carbon dioxide as well as various combinations of the foregoing reactions all carried out with or without varying types of catalysts and under different conditions of temperature, pressure and the like.

The generation of the charge gas has, however, in general been characterized by the formation of more or less carbonaceous material in the nature of coke-like particles which tend to be carried over from the generator into the reactor where they accumulate and impair the hydrocarbon synthesis operation.

While constituting a potential disadvantage in the case of substantially all such types of synthesis gas generation with which I am aware, this carbon formation and entrainment may be particularly objectionable in operations wherein gas generation is carried out primarily by reacting natural gas with oxygen, with or without additions of carbon dioxide or steam. The carbon formed is particularly disadvantageous when it is carried over into the hydrocarbon synthesis reactor with consequent impairment of the operation of the reactor.

This is especially true in connection with processes wherein the hydrocarbon synthesis is catalyzed by a mass of solid catalyst particles maintained in fluidized condition by the passage of reactants therethrough. As is well known, it is necessary when employing this technique to assure the substantially uniform passage of reactant gases through all parts of the powdered catalyst mass whereby each particle is, in effect, buoyed up and surrounded at all times by gases which at the same time keep the particles in a continuous state of random movement. Whether operated under so-called "dense phase" fluidization or under conditions wherein the catalyst particles tend to be substantially fully entrained in the reactant gases, it is apparent that such factors as the catalyst density, particle size and particle shape influence the fluidization. The objectionable type of carbon which may be carried over from the gas generation operation may have the effect of lowering the catalyst density, and furthermore of tending to promote coking and carbonization in the synthesis reaction zone and general fouling of the catalyst.

These particles of carbon moreover are extremely resistant to removal by scrubbing or washing. In short, the surfaces of the carbonaceous particles are not wet by water alone.

In accordance with the present invention, however, it has been discovered that the carbon contained in the synthesis gas may be readily wetted and washed out by means of the water formed in the synthesis reaction and condensed from the effluents of the reactor. Even when operating to produce a maximum yield of hydrocarbons, the catalytic reduction of carbon monoxide results in a small but substantial proportion of oxygenated hydrocarbons. Moreover, the reaction is advantageously and normally so controlled as to result in the by-product formation of water vapor in accordance with the reaction:

$$2H_2 + CO = CH_2 + H_2O$$

With nickel, cobalt or ruthenium type catalyst, this is the normal and prevailing type of reaction, whereas with the iron type of catalyst the reaction of the said character may be so directed by selection of suitable conditions of operation.

The effluent gases from the hydrocarbon synthesis reactor are condensed for separation into permanent gases, a water layer, and a layer of hydrocarbons synthesized in the reaction. By this means the oxygenated hydrocarbons formed are found chiefly in the separated aqueous layer thus produced, usually in rather dilute form and requiring concentration or other chemical or physical treatment for recovery in commercial form.

This aqueous layer containing the water soluble oxygenated hydrocarbons, I have discovered to be ideal for scrubbing entrained carbonaceous contaminants from the synthesis gas. The invention embodies this discovery in a process preferably involving the countercurrent passage, in scrubbing relationship, of synthesis gas through a descending stream of the condensed aqueous solution of oxygenated hydrocarbons prior to passage into the synthesis reactor.

Moreover, when proceeding in accordance with the present disclosure, any lighter fractions of the oxygenated compounds which tend to return to the synthesis reactor with the stream of synthesis gas appear to participate in the synthesis reaction or to undergo chemical change with a resulting increase of desired products.

In order to further illustrate the operation of the present process reference is made to one preferred assembly of apparatus disclosed more or less diagrammatically in the accompanying drawing. In accordance with this arrangement a synthesis gas generator 1 having a gas generation zone 2 receives a mixture of methane and substantially pure oxygen through inlet pipes 3 and 4, respectively. Alternatively, the generator may operate on methane or other hydrocarbons with any desired admixture of oxygen, carbon dioxide and steam, and it is within the broadest scope of the invention to include any of the usual water gas generators or equivalent commercial producers of hydrogen and carbon monoxide operating with coke, coal or any other carbonaceous materials. I prefer, however, to describe the invention in connection with a generator wherein controlled combustion of methane and oxygen is effected under a pressure of about 250 pounds per square inch gauge and a temperature of about 2100° F. If desired, the generator may be filled with refractory particles with or without a catalyst, for example, nickel oxide. Moreover, the feed gases are advantageously preheated in any suitable means, not shown, to a temperature of 500° F. to 1000° F. and introduced into the generator by way of a suitable mixing nozzle or other mixing type of burner.

A second chamber or zone 6 of the generator separated from the gas generation zone 2 by any suitable refractory baffle 7 contains a steam generator 8. While the steam generator may be any suitable type of exchanger, it is indicated diagrammatically by a series of water tubes joined by appropriate headers to a steam drum and supplied with water by pipe 9. Steam formed by heat transfer from the hot gases is withdrawn through pipe 10 for satisfying the energy requirements of the system. In place of the steam generator shown, any appropriate form of economizer may be employed to recover heat energy and apply it at any suitable point, for example, in the preheating of fresh feed to the synthesis gas generator.

The steam generator effects a cooling of the hot synthesis gas from, for example, the temperature of 2100° F. to a temperature convenient for handling, for example, 400° F. to 1000° F. Advantageously, the final temperature is so selected as to properly control the temperature of the synthesis gas passing to the synthesis reactor, as will hereinafter more fully appear.

The resulting partially cooled synthesis gas carrying in suspension particles of carbon formed in the generation zone 2 is withdrawn through conduit 11 and heat exchanger 12 where it is further cooled for admission to the lower portion of a scrubbing or washing tower 13 which may be suitably packed or provided with trays designed for good scrubbing contact between the upwardly flowing synthesis gas and a downwardly flowing stream of washing liquid introduced into the upper portion of the tower through conduit 14 and distributing head 15. The washing liquid containing the suspended particles of carbon is withdrawn from the bottom of the tower as at 16 and the washed gases passed overhead through pipe 17 to the exchanger 12 where they are reheated to a temperature suitable for introduction to the synthesis reactor.

It is advantageous to maintain a relatively low scrubbing temperature to prevent excessive carry-over of water vapor in the synthesis gas stream. In particular, the supply of an advantageously dry stream of feed to the synthesis reactor may be assured by a relatively low terminal gas temperature in the scrubber, for example, in the order of 100° F. or less. The exchanger 12, accordingly performs the dual function of cooling the gaseous feed to the scrubber and reheating the scrubbed gas for the hydrocarbon synthesis step. The scrubbed, dry synthesis gas from the exchanger 12 is passed directly to the synthesis reactor 20 by conduit 18.

The synthesis reactor 20, illustrated more or less symbolically, may comprise any of the conventional types of reactor known in the art. Advantageously, however, the reactor 20 contains a fluidized mass of powdered catalyst maintained in a condition of dense phase fluidization by passage of the reactant gases upwardly therethrough. As is known, the reactor should be provided with cooling means, not shown, to hold the contact mass at predetermined reaction temperature. Operating in this manner, the fluidized mass of catalyst assumes an upper pseudo-liquid level in the reactor from which the reaction gases are liberated and pass outwardly through a duct 21 leading to a cyclone separator 22. Any entrained catalyst particles are separated by the cyclone and returned through a standpipe 23 to the reaction chamber at a point below the pseudo-liquid level of the catalyst mass. The separated gaseous products pass overhead through conduit 24 to a condenser 25 and a separator 26 from which are withdrawn three individual streams, namely, fixed gases, condensed water vapor and hydrocarbon reaction products. The fixed gases comprising normally some hydrogen, carbon dioxide, nitrogen, methane, ethane, ethylene, etc., together with, in some instances, small proportions of carbon monoxide, are removed through pipe 27 for venting, recovery or further recycling as desired. The layer of hydrocarbon products is withdrawn through pipe 28 for recovery or further treatment. The aqueous layer, however, containing dissolved oxygenated hydrocarbons formed in the synthesis operation is withdrawn through pipe 29 and passes through pump 30 and pipe 31 which joins pipe 14 to provide the washing or scrubbing liquid, previously referred to, for washing the carbon particles from the synthesis gas in the tower 13.

In order to permit a more selective return of scrubbing liquid, as well as a prior separation and recovery of certain fractions of the oxygenated hydrocarbons, the aqueous layer is first submitted to treatment for recovery of its several components. To this end, valve 42 in pipe 31 and a branch pipe 32, controlled by valve 33, permit diversion of the water layer in pipe 29 to a distilling or fractionation system represented symbolically by the reference numeral 34.

The number of separate side streams taken from the fractionation system may be varied depending on the products desired for immediate recovery and the requirement of the scrubber 13. It has been found advantageous to take an overhead stream containing $C_1$ to $C_3$ oxygenated hydrocarbons through the pipe 35, a side stream containing $C_4$ to $C_6$ oxygenated hydrocarbons through pipe 36 and a further stream of higher molecular weight oxygenated hydrocarbons by way of pipe 37. The distillate streams in general, in the operations with which I am familiar comprise azeotropic, aqueous solutions of oxygenated hydrocarbons, largely aliphatic primary alcohols, suitable for further use or recovery. The stream containing the higher molecular weight compounds appears to be most advantageous for the function of scrubbing the synthesis gas and, accordingly, pipe 37 connects with pipe 38, which with pump 39 and cooler 40 operates to convey the higher molecular weight compounds to tower 13.

Attention is particularly directed to the fact that the operating temperature of the separator 26 is of significance in regard to the separation and recovery of oxygenated hydrocarbons in the water layer. More specifically with operating temperatures below 100° F. and preferably as low as 40–50° F., at least the major portion of the oxygenated hydrocarbons including relatively high molecular weight alcohols will appear in the water layer. Moreover, a relatively cool scrubbing liquor is of advantage in maintaining the relatively low terminal temperature of the gases leaving the scrubbing tower, as previously mentioned.

Means are also advantageously provided for recirculating the scrubbing liquor through the scrubbing tower, comprising a branch pipe 44 extending between outlet pipe 16 and the scrubbing liquor inlet pipe 14. In the embodiment shown, a cooling device 45 and a pump 46 function to supply the recirculated liquid at any desired rate and at a temperature appropriate to hold the desired terminal temperature of the scrubbed gases.

In operation the generator supplies hot synthesis gas to the exchanger 12 from which it is withdrawn at a moderate temperature to the scrubber 13. Therein the carbon is effectively removed by the solution of oxygenated hydrocarbons and the water vapor removed to the low value corresponding to the terminal conditions at the top of tower 13. The scrubbed gases again pass the exchanger 12 in indirect heat exchange relationship to the hot gases from the generator and move by way of conduit 18 to the synthesis reactor at a temperature suitable for reaction.

As is known, the optimum temperature of the synthesis reaction depends upon such factors as the type of catalyst used and the products desired. The incoming gases should advantageously be somewhat cooler than the reaction temperature as, for example, from 20 to 100° F. cooler, although this is not critical. The reaction gases pass the condenser 25, and in the separator 26 fixed gases pass overhead for further use or disposition, the hydrocarbon layer is recovered, and the water layer either returned directly to the scrubbing tower or subjected to fractionation with return of a selected fraction.

An important feature of the present invention is the use of the aqueous solution of oxygenated hydrocarbons for the dual purpose of quenching synthesis gas and washing suspended carbon particles therefrom. For such operation, the drawing shows pipe 51 which conveys a part of the aqueous solution from pipe 29 to a point intermediate the steps of generating synthesis gas and washing suspended carbon therefrom in order to quench the hot gas. Thus, the cooling liquid may flow through branch pipe 52, controlled by valve 53, into the stream 11 of hot synthesis gas and become flashed in this stream to effect cooling prior to the passage of the gas through heat exchanger 12. With this arrangement, the steam generator 8 associated with the synthesis gas generator 1 may be omitted, if desired. Alternatively, the cooling liquid may pass through branch pipe 54, controlled by valve 55, and flash in the synthesis gas flowing from the heat exchanger 12 through pipe 11 to the washing tower 13.

When the process of this invention involves fractionation of the aqueous solution of oxygenated hydrocarbons and utilization of a fraction containing the higher molecular weight compounds as wash liquid to remove solid carbonaceous contaminants from the synthesis gas, it is sometimes advantageous, depending upon the conditions maintained in the synthesis reaction, to feed the lower molecular weight compounds to the synthesis reactor. A typical arrangement for such utilization of lower molecular weight oxygenated hydrocarbons is shown in the drawing, comprising branch pipe 56 and pump 57 to convey these compounds from pipe 35 to reactor 20. It is advisable to remove water by any conventional means from the stream of compounds returned to the synthesis reactor since excessive water is known to be detrimental to the reaction.

According to one specific example, methane and substantially pure oxygen are supplied to the synthesis gas generator in the approximate molar ratio of 2:1 operating at about 2100° F. and 200 pounds per square inch gauge. The product is cooled to about 600° F. by passage through a steam generating exchanger. The hot synthesis gas, neglecting the entrained carbon, has a composition substantially as follows:

|  | Mol percent |  | Mol percent |
| --- | --- | --- | --- |
| $H_2$ | 53.4 | CO | 29.4 |
| $N_2$ | 1.5 | $CO_2$ | 1.8 |
| $CH_4$ | 4.2 | $H_2O$ | 9.7 |

It is passed in heat exchange relationship with the gaseous effluent from the scrubber and thus reduced to a temperature of 250° F. In the scrubber it passes countercurrently to a downflowing stream of scrubbing liquid amounting to about 35 gallons for each 4000 standard cubic feet of synthesis gas. The scrubbing liquid has an inlet temperature of 100° F. and an exit temperature of 200° F. The substantially dry and carbon-free synthesis gas at 100° F. returned to the heat exchanger previously mentioned is heated by the gases from the generator and emerges at a temperature of 470° F. for supply directly to the synthesis reactor.

The synthesis reactor operates with a filling of iron powder of 200 mesh and finer, 60% passing a 325 mesh screen, containing about one percent potassium oxide ($K_2O$) and about two percent alumina ($Al_2O_3$). The reaction is maintained at a temperature of 600° F. and a pressure of 200 pounds per square inch gauge. The powder is maintained in a state of dense phase fluidization by passage of the reactant gases at a linear velocity of about two feet per second through the reactor. Contact time is about ten seconds.

The gaseous reaction product is cooled to 100°

F. and the water layer separated and returned directly to scrub the synthesis gas in the scrubbing tower. A portion of the scrubbing liquid is recirculated through the tower, with intermediate cooling of the recycled stream to 100° F. prior to each pass. The total rate of scrubbing liquid flow through the tower is about 35 gallons per 4000 standard cubic feet of synthesis gas.

With the foregoing arrangement, substantially no detectible carbon is carried through the scrubber in the synthesis gas stream, although appreciable quantities occur in the generator effluent. The recovery of hydrocarbons and further treatment, recycle or recovery of fixed gases may proceed in any conventional manner. Good yields of hydrocarbons boiling in the gasoline range occur when operating as above.

The aqueous layer cycled to the scrubbing tower contains about 5% oxygenated hydrocarbons in solution. Accordingly, the scrubbing tower liquid withdrawn from the pipe 16 is economically treated for recovery of these valuable constituents. This stream may be further concentrated or fractionated in separate conventional equipment, not shown, or in column 34. As shown, valve 16a in pipe 16 may be closed and the liquid passed through pipe 47 and pump 48 to column 34, the liquid flowing alternately through filters 49 and 50 which remove the suspended carbonaceous solids washed out of the synthesis gas in tower 13.

While the above specific example contemplates direct return of the aqueous layer to the scrubber, in accordance with another example, the aqueous layer is fractionated to separate a stream containing essentially $C_4$ and higher oxygenated hydrocarbons and this stream is returned to the system as a scrubbing liquid under the same conditions as before.

It will be understood from the foregoing, that where other catalysts are employed, temperatures and other conditions will be modified accordingly. Thus with a cobalt catalyst, reaction temperatures for the synthesis of predominantly liquid hydrocarbons in the motor gasoline boiling range will approximately 400° F. and the feed stream of synthesis gas should have a temperature somewhat below that temperature. Likewise under such conditions lower pressures approximating atmospheric are more desirable.

In either of the foregoing examples the yield of hydrocarbon products of the synthesis compares favorably with the optimum theoretical yield and no difficulty is experienced over long periods of operation with an accumulation of generator carbon in the synthesis reaction zone.

While specific mention has been made of the use of iron catalyst, other metals of the iron group, as for example, nickel, cobalt, and ruthenium, are well suited to the process and offer some advantages over iron in that they tend, without special precaution, to the quantitative production of water vapor as a by-product of the reaction. In contrast when using an iron catalyst, special precautions are necessary to favor the production of water vapor instead of carbon dioxide as the by-product of the hydrocarbon synthesis reaction.

It is, of course, contemplated that various other promoters and activators may be added to the catalyst as required. These may comprise in addition to or in lieu of the alumina and potassium oxide described above, other compounds of alkali and alkaline earth metals, the oxides of titanium and silicon and the salts of molybdenum and chromium. For example, moreover, the catalyst may be supported on silica gel, diatomaceous earth, or the like, where desired. As is further known the temperature of the synthesis reaction may be varied between 200 and 700° F., depending on the catalyst employed and the products desired, and the pressure may vary over a broad range.

While the present invention has been illustrated more particularly in connection with the predominant production of hydrocarbons wherein a small proportion of oxygenated hydrocarbon products more or less inevitably result, it is equally applicable to operation for synthesis of a product comprising predominantly the oxygenated type of hydrocarbons. Under such conditions an aqueous product may be even more effective in scrubbing out the objectionable particles of carbon in the synthesis gas.

Obviously many modifications and variations of the invention will be apparent to those skilled in the art in the light of the foregoing disclosures without any enlargement of the spirit and scope thereof and therefore only such limitations should be imposed as are indicated in the appended claims.

I claim:

1. In the catalytic production of hydrocarbons from carbon monoxide and hydrogen, a process which comprises generating a synthesis gas containing carbon monoxide and hydrogen but substantially no oxygenated hydrocarbons in a gas generation zone under conditions, involving partial combustion of hydrocarbonaceous material at a temperature in order of 2100° F. and higher with oxygen, which result in a generator effluent gas having entrained therein small amounts of difficultly removable solid carbonaceous particles formed in said generation zone, scrubbing said particles from said effluent gas with liquid obtained at a subsequent point in the process, passing resulting scrubbed gas to a synthesis reaction zone containing a synthesis catalyst maintained under conditions effective for the reaction of carbon monoxide with hydrogen, removing from said synthesis zone a product containing hydrocarbons, water and some oxygenated hydrocarbons, separating from said product a liquid fraction consisting essentially of water containing dissolved oxygenated hydrocarbons and effecting the aforesaid scrubbing with said separated liquid fraction.

2. The method according to claim 1 in which the liquid fraction used in scrubbing consists essentially of water containing about 5% by weight of dissolved oxygenated hydrocarbons.

3. The method according to claim 1 in which the liquid fraction used in scrubbing consists essentially of water containing dissolved oxygenated hydrocarbons having in the range of one to six carbon atoms per molecule.

4. In the catalytic production of hydrocarbons from carbon monoxide and hydrogen, a process which comprises generating a synthesis gas containing carbon monoxide and hydrogen but substantially no oxygenated hydrocarbons in a gas generation zone by the partial combustion of hydrocarbonaceous material with oxygen at a temperature in the order of 2100° F. and higher to yield a generator effluent gas having entrained therein small amounts of difficulty removable solid carbonaceous particles formed in said generation zone, scrubbing said particles from said effluent gas with scrubbing liquid obtained at a subsequent point in the process, passing resulting scrubbed gas to a synthesis reaction zone containing a synthesis catalyst maintained under conditions effective for the reaction of carbon monoxide with hydrogen, removing from said synthesis zone a product containing normally liquid hydrocarbons, water and some oxygenated hydrocarbons, separating from said product an aqueous fraction containing oxygenated hydrocarbons in solution, and effecting the aforesaid scrubbing with said aqueous fraction as the scrubbing liquid.

5. The method according to claim 4 in which the aqueous fraction used for scrubbing comprises oxygenated hydrocarbons having in the range of 1 to 6 carbon atoms per molecule.

6. In the catalytic production of hydrocarbons from carbon monoxide and hydrogen, a process which comprises generating a synthesis gas containing carbon monoxide and hydrogen but substantially no oxygenated hydrocarbons in a gas generation zone by the partial combustion of hydrocarbonaceous material with oxygen at a temperature in the order of 2100° F. and higher to yield a generator effluent gas having entrained therein small amounts of difficulty removable solid carbonaceous particles formed in said generation zone, scrubbing said particles from said effluent gas with scrubbing liquid obtained at a subsequent point in the process, passing resulting scrubbed gas to a synthesis reaction zone containing a synthesis catalyst maintained under conditions effective for the reaction of carbon monoxide with hydrogen, removing from said synthesis zone a product containing normally liquid hydrocarbons, water and some oxygenated hydrocarbons, separating from said product an aqueous fraction containing oxygenated hydrocarbons in solution, effecting the aforesaid scrubbing with a portion of said aqueous fraction, separating from another portion of said aqueous fraction oxygenated hydrocarbons having from one to three carbon atoms per molecule and returning the separated oxygenated hydrocarbons to the synthesis reaction zone.

7. In the catalytic production of hydrocarbons from carbon monoxide and hydrogen, a process which comprises generating a synthesis gas containing carbon monoxide and hydrogen in a gas generation zone under conditions, including an elevated temperature, which result in a generator effluent gas having entrained therein difficulty removable solid carbonaceous particles formed in said generation zone, scrubbing said particles from said effluent gas in a scrubbing zone with scrubbing liquid obtained at a subsequent point in the process, passing resulting scrubbed gas to a synthesis reaction zone containing a synthesis catalyst maintained under conditions effective for the reaction of carbon monoxide with hydrogen, removing from said synthesis zone a product containing normally liquid hydrocarbons, water and some oxygenated hydrocarbons, separating from said product an aqueous fraction containing oxygenated hydrocarbons in solution, effecting the aforesaid scrubbing with a portion of said aqueous fraction as the scrubbing liquid, subjecting another portion of said aqueous fraction to fractional distillation in a fractionating zone, passing to said fractionating zone used scrubbing liquid removed from the scrubbing zone, removing from the fractionating zone a distillate containing oxygenated hydrocarbons having from one to three carbon atoms per molecule and returning the oxygenated hydrocarbons contained in said distillate to the synthesis reaction zone.

PERCIVAL C. KEITH.

REFERENCES CITED

The following references are of record in the file of this patent:

UNITED STATES PATENTS

| Number | Name | Date |
|---|---|---|
| 1,754,371 | Stengel | Apr. 15, 1930 |
| 1,801,436 | Lewis | Apr. 21, 1931 |
| 2,132,533 | Koppers | Oct. 11, 1938 |
| 2,188,439 | Kirkpatrick | Jan. 30, 1940 |
| 2,417,164 | Huber, Jr. | Mar. 11, 1947 |
| 2,431,455 | Blanding | Nov. 25, 1947 |
| 2,482,284 | Michael et al. | Sept. 20, 1949 |

OTHER REFERENCES

Lange: Handbook of Chemistry, 6th edition, pages 1568 to 1569.